(12) United States Patent
Hiramatsu (10) Patent No.: US 6,756,722 B2
(45) Date of Patent: Jun. 29, 2004

(54) METHOD FOR FABRICATING SPARK PLUG WITH PIEZOELECTRIC SENSOR AND SPARK PLUG FABRICATED BY THE SAME

(75) Inventor: Hiromi Hiramatsu, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/175,066

(22) Filed: Jun. 20, 2002

(65) Prior Publication Data

US 2002/0195917 A1 Dec. 26, 2002

(30) Foreign Application Priority Data

Jun. 20, 2001 (JP) ........................................ 2001-187128
Feb. 19, 2002 (JP) ........................................ 2002-041498

(51) Int. Cl.⁷ .............................................. H01T 13/22
(52) U.S. Cl. ...................... 313/144; 313/118; 313/119; 73/714
(58) Field of Search ................................ 313/118, 119, 313/142, 143, 144, 120, 128; 73/115, 714, 754

(56) References Cited

U.S. PATENT DOCUMENTS 4,169,388 A * 10/1979 Teitelbaum et al. ........... 73/714
5,479,817 A * 1/1996 Suzuki et al. ................ 313/118
5,955,826 A * 9/1999 Suzuki et al. ................ 313/119
6,559,577 B2 * 5/2003 Okazaki et al. .............. 313/118

FOREIGN PATENT DOCUMENTS

JP 58-23194 2/1983

* cited by examiner

*Primary Examiner*—Don Wong
*Assistant Examiner*—Jimmy T. Vu
(74) *Attorney, Agent, or Firm*—Nixon & Vanderhye PC (57) ABSTRACT

A spark plug fabricating method and a spark plug fabricated by the same are provided. The spark plug is equipped with a piezoelectric sensor working to measure the pressure of combustion of fuel in an engine and required to apply a given preload to the piezoelectric sensor at all the time. The piezoelectric sensor is disposed within a holder and retained between the holder and a porcelain insulator. The fabrication method includes the steps of pressing the holder to apply a required preload to the piezoelectric sensor in a longitudinal direction of the porcelain insulator and joining the holder to a metal shell while maintaining the preload applied to the piezoelectric sensor as it is.

12 Claims, 12 Drawing Sheets

METHOD FOR FABRICATING SPARK PLUG WITH PIEZOELECTRIC SENSOR AND SPARK PLUG FABRICATED BY THE SAME

BACKGROUND OF THE INVENTION

1. Technical Field of the Invention

The present invention relates generally to a method of fabricating a spark plug equipped with a piezoelectric sensor working to measure the pressure of combustion of fuel in internal combustion engines and a spark plug fabricated by the same.

2. Background Art

Japanese Utility Model First Publication No. 58-23194 discloses a spark plug with a piezoelectric sensor installed on the periphery of a porcelain insulator within a housing. An annular holder or nut is screwed into the housing to apply a preload to the piezoelectric sensor which is required for the piezoelectric sensor to transform mechanical deformation thereof into an electric voltage signal.

The above type of spark plug, however, encounters the drawback in that the nut screwed into the housing abuts directly on the piezoelectric sensor, thus resulting in distortion of the piezoelectric sensor. In the worst case, the breakage of the piezoelectric sensor results.

It is usually necessary to place the piezoelectric sensor in a waterproof environmental condition. It is, however, difficult to avoid entrance of water from between the nut and the housing completely.

SUMMARY OF THE INVENTION

It is therefore a principal object of the invention to avoid the disadvantages of the prior art.

It is another object of the invention to provide a fabrication method of spark plugs for avoiding breakage of a piezoelectric sensor subjected to a preload.

It is a further object of the invention to provide a fabrication method of spark plugs for avoiding entrance of water into a piezoelectric sensor.

It is a still further object of the invention to provide a spark plug made by either of the above fabrication methods.

According to one aspect of the invention, there is provided a spark plug fabricating method which comprises the steps of: (a) preparing a press jig; (b) preparing a spark plug assembly made up of a hollow cylindrical porcelain insulator having a given length in which a center electrode is disposed, a housing in which the center electrode is retained through the porcelain insulator and which has a ground electrode installed thereon, a piezoelectric sensor designed to be responsive to pressure of combustion of fuel within an engine transmitted through the porcelain insulator to provide a signal indicative thereof, and a holder put on the housing for holding the piezoelectric sensor mechanically; (c) placing the spark plug assembly within the press jig; (d) pressing the holder to apply a given preload to the piezoelectric sensor in a longitudinal direction of the porcelain insulator; and (e) joining the holder to the housing while maintaining the preload applied to the piezoelectric sensor to fabricate a spark plug completely.

In the preferred mode of the invention, the press jig includes a press block having opposed ends one of which abuts on the holder and a screw which abuts on the other end of the press block and is rotated to press the holder through the press block.

The holder may be jointed to the housing by at least one of staking and welding.

According to the second aspect of the invention, there is provided a spark plug which may be employed in a gas engine of a generator in cogeneration systems or automotive internal combustion engines. The spark plug comprises: (a) a center electrode; (b) a porcelain insulator having a first and a second length, the first length having the center electrode retained therein; (c) a hollow cylindrical housing in which the center electrode is retained through the porcelain insulator and which has a ground electrode installed thereon; (d) a piezoelectric sensor disposed on an outer periphery of the second length of the porcelain insulator, the piezoelectric sensor being responsive to pressure of combustion of fuel within an engine transmitted through the porcelain insulator to provide a signal indicative thereof; and (e) a holder welded to the housing so as to apply a given preload to the piezoelectric sensor at all times.

In the preferred mode of the invention, the holder is made of a hollow cylinder one end of which is welded to an overall circumference of the housing. A sealing member is disposed between the other end of the hollow cylinder and the porcelain insulator. The piezoelectric sensor is disposed within a chamber formed between the holder and the porcelain insulator.

The holder may also include an annular disc. The hollow cylinder is welded at the one end thereof to the overall circumference of the housing and at the other end to the whole of an outer circumference of the annular disc. The sealing member may be disposed between an inner periphery of the annular disc and the porcelain insulator. The piezoelectric sensor is disposed within a chamber defined by the hollow cylinder, the annular disc, and the porcelain insulator.

A chamber is defined within which the piezoelectric sensor is disposed and filled with a resinous material.

A shoulder may be formed on an outer periphery of the porcelain insulator. A seat member may be disposed between the shoulder and the piezoelectric sensor in direct contact with the shoulder for transmission of the pressure of combustion of fuel to the piezoelectric sensor through the seat member.

The housing may have an end portion which is far from the center electrode and staked on the porcelain insulator to retain the porcelain insulator within the housing. The seat member may alternatively be disposed between the staked end portion of the housing and the piezoelectric sensor in direct contact with the staked end portion for transmission of the pressure of combustion of fuel to the piezoelectric sensor through the staked end portion and the seat member.

According to the third aspect of the invention, there is provided a spark plug which comprises: (a) a center electrode; (b) a porcelain insulator having a first and a second length, the first length having the center electrode retained therein; (c) a hollow cylindrical housing in which the center electrode is retained through the porcelain insulator and which has a ground electrode installed thereon; (d) a piezoelectric sensor disposed on an outer periphery of the second length of the porcelain insulator, the piezoelectric sensor being responsive to pressure of combustion of fuel within an engine transmitted through the porcelain insulator to provide a signal indicative thereof; and (e) a holder staked on the housing so as to apply a given preload to the piezoelectric sensor at all times.

In the preferred mode of the invention, a chamber within which the piezoelectric sensor is disposed is filled with a resinous material.

The spark plug further comprises a shoulder formed on an outer periphery of the porcelain insulator and a seat member disposed between the shoulder and the piezoelectric sensor in direct contact with the shoulder for transmission of the pressure of combustion of fuel to the piezoelectric sensor through the seat member.

The housing may have an end portion which is far from the center electrode and staked on the porcelain insulator to retain the porcelain insulator within the housing. The seat member may alternatively be disposed between the staked end portion of the housing and the piezoelectric sensor in direct contact with the staked end portion for transmission of the pressure of combustion of fuel to the piezoelectric sensor through the staked end portion and the seat member.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
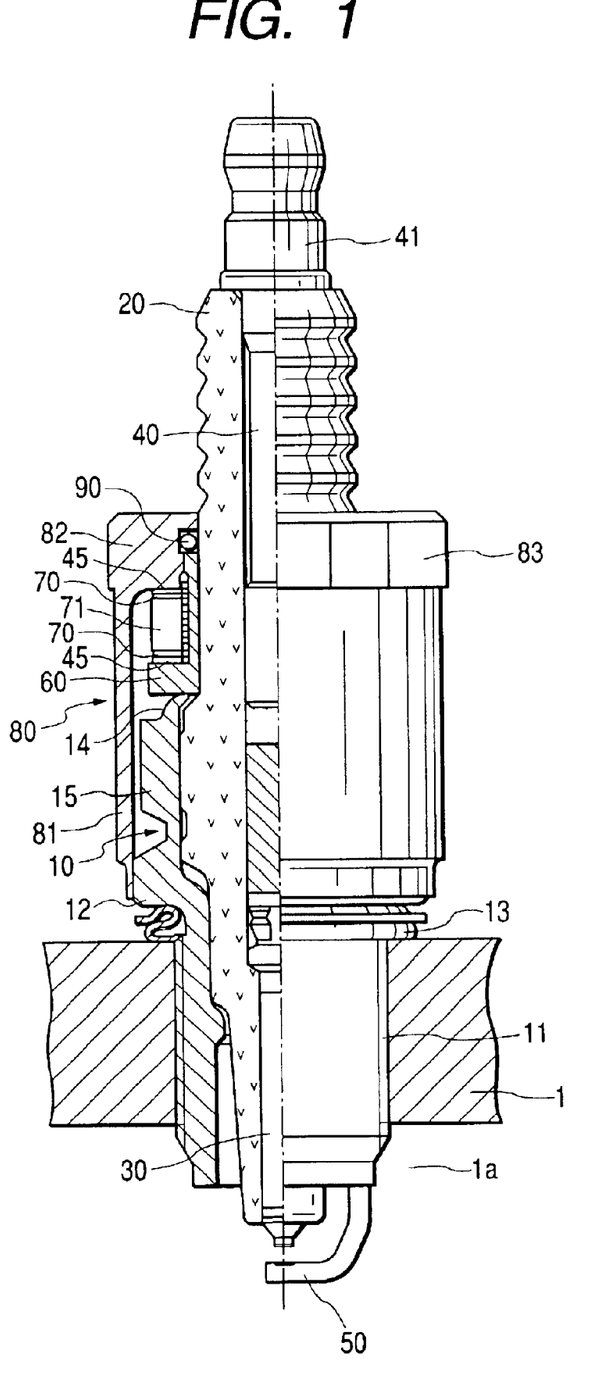
FIG. 1 is a longitudinal partial sectional view which shows a spark plug according to the first embodiment of the invention.

Referring now to the drawings, particularly to FIG. 1, there is shown a spark plug 200 according to the invention which may be employed in a gas engine of a generator in cogeneration systems or automotive internal combustion engines.

The spark plug 200 has a hollow cylindrical housing or shell 10 made of a conductive steel material such as a low-carbon steel. The metal shell 10 has a flange 12 and a thread 11 for mounting the spark plug 200 in a cylinder head 1 of the engine. The mounting of the spark plug 200 is achieved by inserting the thread 11 of the metal shell 10 into a screw hole formed in the cylinder head 1 through a packing 13 disposed between the flange 12 and the thread 11. The cylinder head 1 defines a combustion chamber 1a within the engine.

The spark plug 200 also includes a cylindrical porcelain insulator 20, a center electrode 30, a ground electrodes 50, and a stem 40 on which a terminal 41 is installed. The porcelain insulator 20 is made of an alumina ceramic ($Al_2O_3$) and retained within the metal shell 10. Specifically, the porcelain insulator 20 is inserted into the metal shell 10 on the side of the center electrode 30 and exposed outside the metal shell 10 on the side of the stem 40. the metal shell 10 has an elastically deformable annular portion 14 which is pressed or staked inwardly to hold the porcelain insulator 20 in the metal shell 10 firmly. The metal shell 10 also has a flange 15 continuing from the annular portion 14.

The porcelain insulator 20 has formed therein a longitudinal central hole within which the center electrode 40 and the stem 40 are installed in an electrically insulating fashion. The center electrode 30 consists of a core portion made of a metallic material such as Cu having a higher thermal conductivity and an external portion made of a metallic material such as an Ni-based alloy having higher thermal and corrosion resistances. The center electrode 30 has a tip extending outside the top of the porcelain insulator 20. The stem 40 is made of a metallic material and has the terminal 40 extending outside the porcelain insulator 20.

The ground electrode 50 is made of an Ni-based alloy bar whose main component is nickel and welded directly to the end of the metal shell 10. The ground electrode 50 has a tip portion bent at 90° to define a gap (usually called spark gap) between itself and the tip of the center electrode 30.

Figure 3:
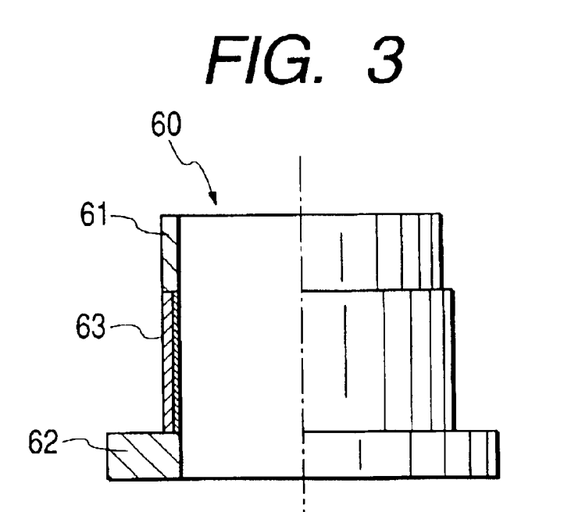
FIG. 3 is a longitudinal partial sectional view of FIG. 2.

A seat 60 is put around the porcelain insulator 20 above the annular portion 14 of the metal shell 10. The seat 60 is made of metal for eliminating high-frequency noises arising from the stem 40. The seat 60 is, as clearly shown in FIG. 3, made up of a hollow cylinder 61 and a flange 62 extending from a lower end of the cylinder 61, as viewed in FIG. 1, outward. The flange 62 abuts on the annular portion 14 of the metal shell 10. An insulator 63 is attached to an outer periphery of the cylinder 61 for establishing insulation of a piezoelectric sensor and an electrode 71, as will be described later in detail, from the seat 60. The insulator 63 may be implemented by a heat-shrinkable tubing made of tetrafluoroethylene (PTFE).

Referring back to FIG. 1, the electrode 71 made of a ring member is interposed between an upper piezoelectric device 70 and a lower piezoelectric device 70 around the cylinder 61 of the seat 60. Washers 45 having rough surfaces are laid on the upper and lower piezoelectric devices 70 for avoiding breakage of the piezoelectric devices 70. The upper and lower piezoelectric devices 70 and the electrode 71 constitutes the piezoelectric sensor. Each of the piezoelectric devices 70 is formed by a ring-shaped member made of lead titanate or lead zirconate titanate and works to produce an electric charge which changes as a function of an applied mechanical stress. The piezoelectric sensor is used to measure the pressure of combustion of fuel within the combustion chamber 1a of the engine.

Figure 2:
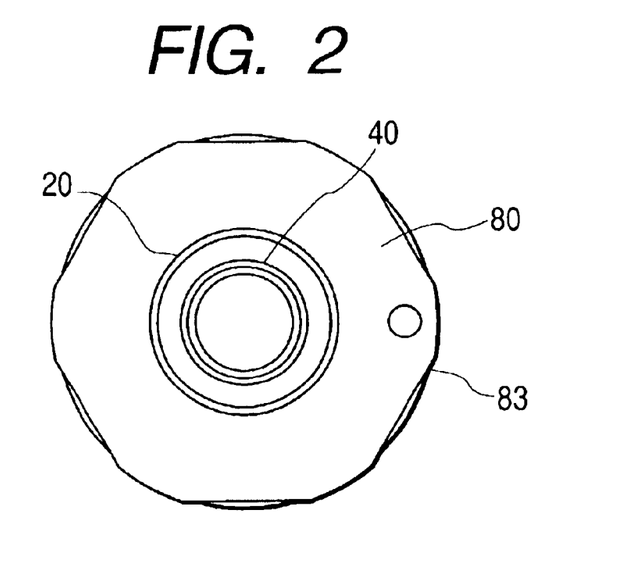
FIG. 2 is a top view which shows a seat for use in retaining a piezoelectric sensor.

The spark plug 200 also has a metallic holder 80 put on a portion of the metal shell 10 extending outside the cylinder head 1 of the engine. The holder 80 defines between itself and the porcelain insulator 20 an annular chamber within which the seat 60, the piezoelectric devices 70, and the electrode 71 are disposed. The holder 80 is made up of a hollow cylinder 81 and an annular plate or head 82 extending from an end of the cylinder 81 inwardly in contact with the piezoelectric devices 70. The holder 80 is welded at an open end thereof to the overall circumference of the flange 12 of the metal shell 10. The head 82 has formed in an inner wall thereof a groove in which a rubber O-ring 90 is disposed to establish a liquid-tight seal between the holder 80 and the porcelain insulator 20. The holder 80 also has formed on an outer periphery thereof a hexagon head 83, as clearly shown in FIG. 2, for facilitating ease of installation of the spark plug 200 in the cylinder head 1.

Figure 4:
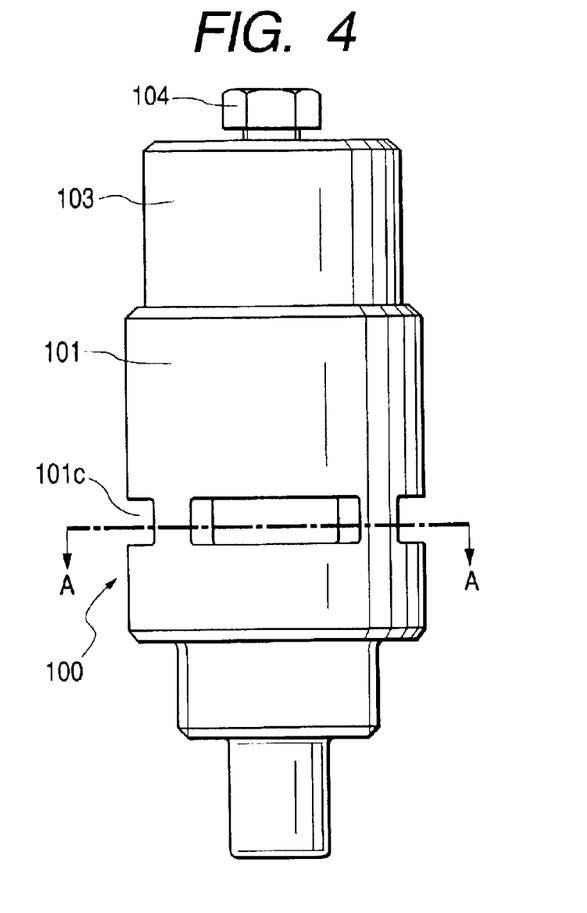
FIG. 4 is a plan view which shows a press jig use to provide a preload to a piezoelectric sensor.
Figure 5:
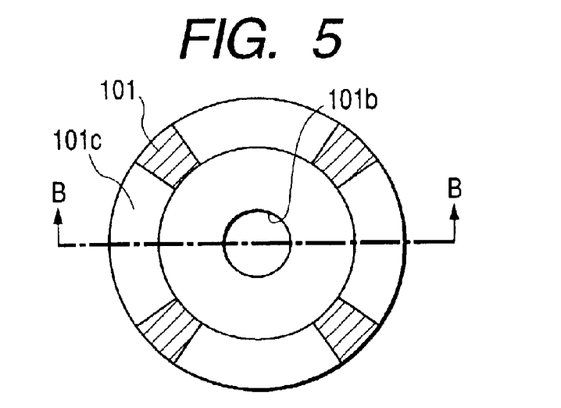
FIG. 5 is a transverse sectional view taken along the line A—A in FIG. 4.

The joining of the holder 80 and the metal shell 10 that is one of fabrication processes of the spark plug 200 will be described in detail with reference to FIGS. 4 to 6.

The holder 80 is pressed using a press jig 100 in a lengthwise direction of the metal shell 10 to provide a preload to the piezoelectric devices 70 and welded to the flange 12 of the metal shell 10. The press jig 100, as clearly shown in FIG. 6, consists of a base 101, an inner press block 102, a cover 103, and a bolt 104.

Figure 6:
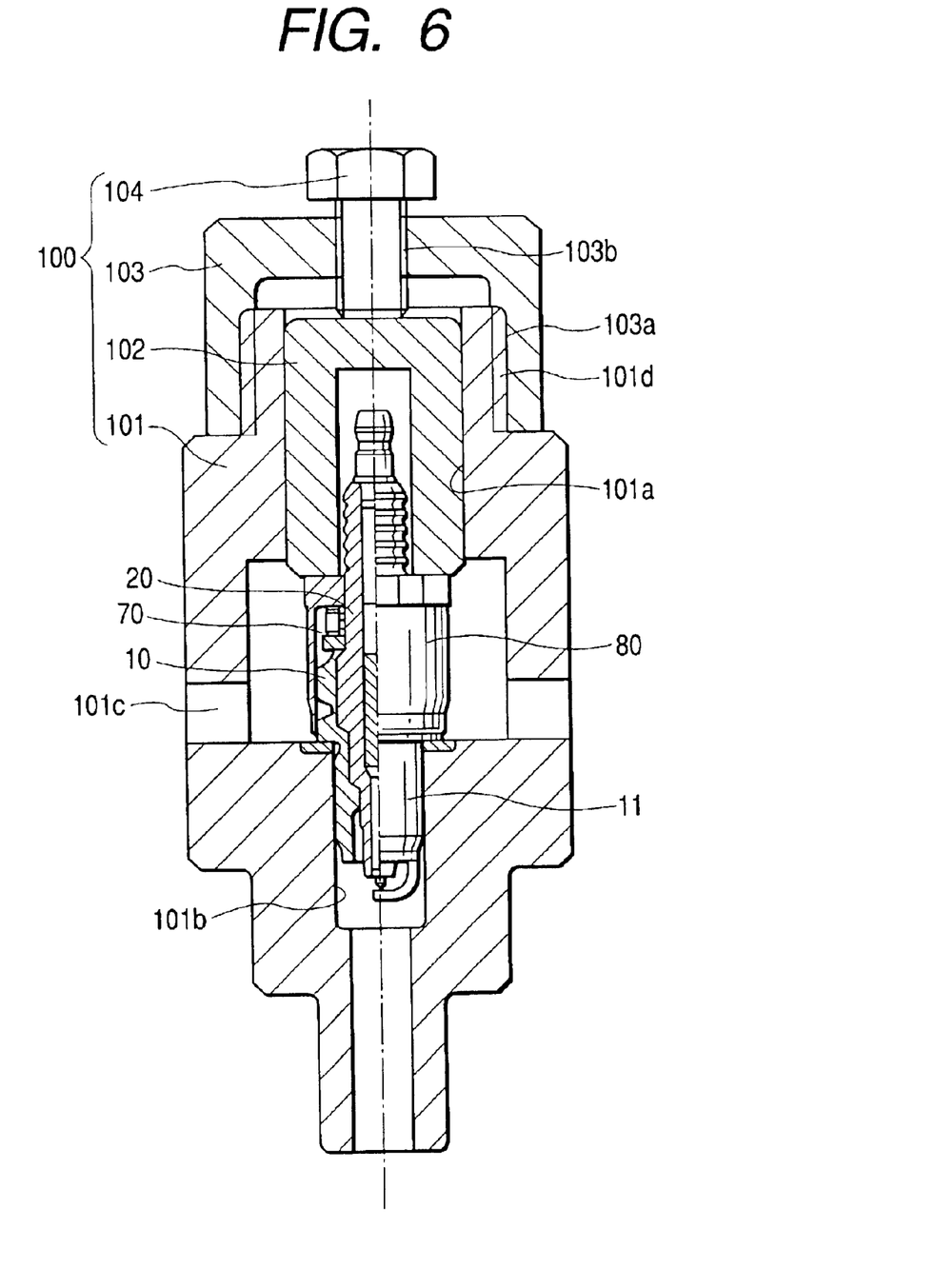
FIG. 6 is a longitudinal sectional view taken along the line B—B of FIG. 5.

The base 101 is made of a hollow cylinder which has formed in an upper end, as viewed in FIG. 6, a first hole 101a having an inner diameter greater than a maximum diameter of the spark plug 200. The base 101 also has formed in the other end thereof a second hole 101b which is aligned with the first hole 101a and has an inner diameter slightly greater than an outer diameter of the thread 11 of the spark plug 200. The spark plug 200 is put in the press jig 100 from the first hole 101a. The thread 11 is inserted into the second hole 101b, thereby holding the spark plug 200 in the base 101. The base 101 also has four through holes 101c formed in a peripheral wall thereof at regular intervals. Each hole 101c faces the flange 12 of the metal shell 10 to which the holder 80 is welded. The base 101 has a thread 101d cut in a boss formed on the end of the cylinder 101.

The press block 102 has a bottom and is disposed slidably within the first hole 10a in direct contact of an open end thereof with the head 82 of the holder 80. The cover 103 has formed thereon an outer thread 103a for establishing screw engagement with the thread 101d of the base 101 and formed in a bottom thereof an inner thread 103b for establishing screw engagement with the bolt 104.

The installation of the holder 80 on the metal shell 10 is accomplished by the following process.

First, after completion of assembling of all parts of the spark plug 200 except the packing 13, the spark plug 200 is inserted into the press jig 100 from the first hole 101a. The thread 11 is screwed into the second hole 101b to hold the spark plug 200 within the base 101.

Next, the press block 102 is inserted from the first hole 101a. After abutment of the press block 102 against the head 82 of the holder 80, the cover 103 with the bolt 104 is attached to the base 101 in engagement of the thread 103a with the thread 101d of the base 101.

The bolt 104 is tightened with a given torque to press the holder 80 through the press block 102 in the lengthwise direction of the porcelain insulator 20, thereby providing a preload (i.e., a compressive pressure) to the piezoelectric devices 70.

While keeping the preload, a laser beam is radiated through the through holes 101c to a plurality of portions of the holder 80, thereby joining the open end of the holder 80 to the flange 12 of the metal shell 10 temporarily.

After completion of welding of the holder 80 to the metal shell 10, the spark plug 200 is removed from the press jig 100. A laser beam is radiated to the overall circumference of the cylinder 81 of the holder 80 to weld the holder 80 to the flange 12 of the metal shell 10 completely. Other fabrication processes of the spark plug 200 are not major part of the present invention and well known in the art. Explanation thereof in detail will, therefore, be omitted here.

In use, the spark plug 200 thus fabricated is installed in the cylinder head 1 through the packing 13. When an air-fuel mixture is burned in the combustion chamber 1a of the engine, it will cause the combustion pressure to act on the porcelain insulator 20 to press it upward, as viewed in FIG. 1. This upward pressure is transmitted or applied to the piezoelectric devices 70 through the annular portion 14 of the metal shell 10 and the flange 62 of the seat 60. The piezoelectric devices 70 produces an electric signal as a function of the pressure applied thereto (i.e., the combustion pressure).

As apparent from the above discussion, the preload applied to the piezoelectric devices 70 may be adjusted finely by controlling the pressure tightening the bolt 104 of the press jig 100. The use of the press block 102 disposed between the bolt 104 and the holder 80 serves to avoid direct transmission of the torque of the bolt 104 to the holder 80, thereby minimizing twisting of the holder 80 arising from the rotation of the bolt 104 to avoid undesirable breakage of the piezoelectric devices 70.

Further, the holder 80 is welded directly to the metal shell 10 without twisting the holder 80, so that no torque is transmitted to the piezoelectric devices 70 during installation of the holder 80.

The overall circumference of the cylinder 81 of the holder 80 is welded to the flange 12 of the metal shell 10, thereby establishing a liquid-tight seal therebetween. Additionally, a gap between the inner wall of the head 82 of the holder 80 and the porcelain insulator 20 is sealed by the O-ring 90, thus avoiding the entrance of water to the piezoelectric devices 70 completely.

Figure 7:
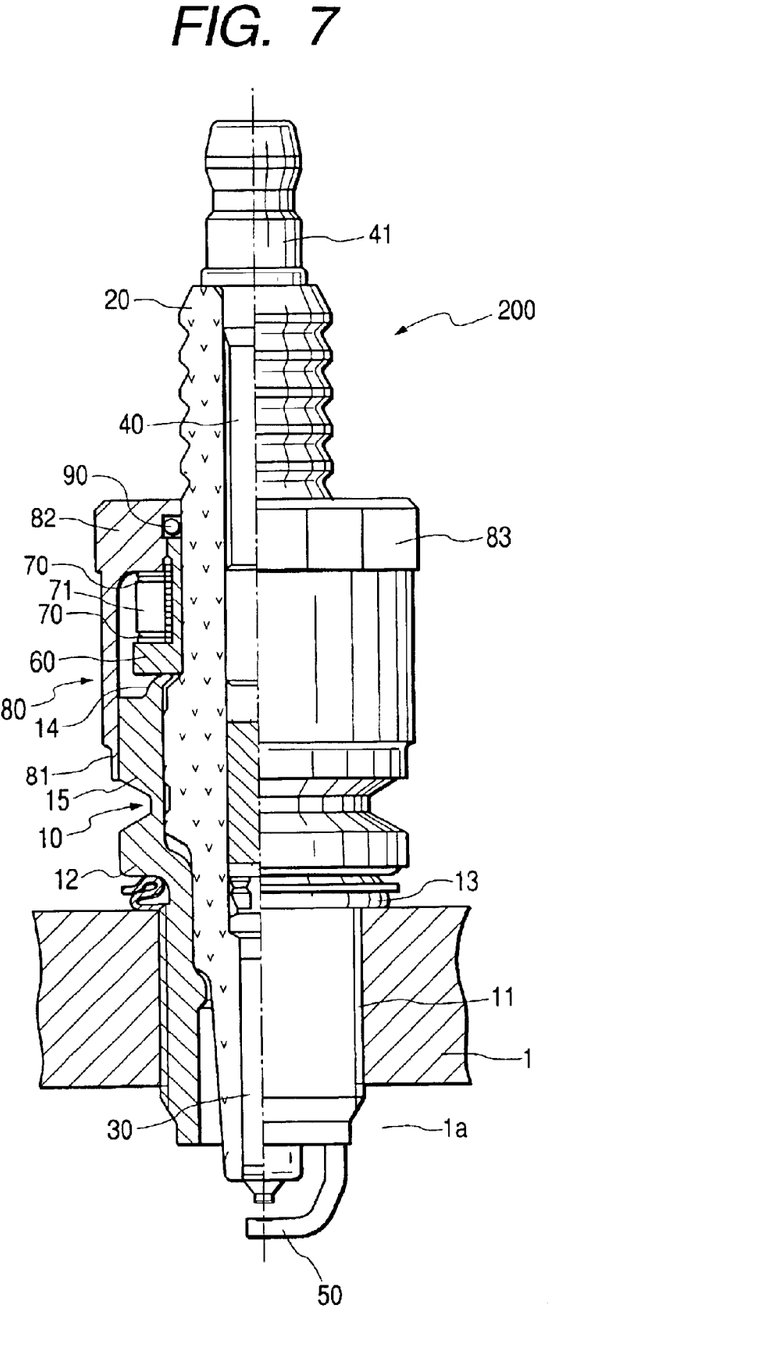
FIG. 7 is a longitudinal partial sectional view which shows a spark plug according to the second embodiment of the invention.

FIG. 7 shows a spark plug 200 according to the second embodiment of the invention which is different from the one shown in FIG. 1 only in a location where the holder 80 is welded to the metal shell 10. Other arrangements are identical, and explanation thereof in detail will be omitted here.

The cylinder 81 of the holder 80 is shorter than in the first embodiment for increasing the rigidity thereof. The open end of the cylinder 81 is welded to the whole of a circumference of the second flange 15 formed, as viewed in the drawing, above the flange 12 of the metal shell 10. This results in a decrease in expansion of the cylinder 81 of the holder 80 arising when the porcelain insulator 20 is subjected to the combustion pressure, thereby improving the sensitivity of the piezoelectric devices 70.

The first flange 12 may be increased in outer diameter more than a maximum diameter of the holder 80 to form a hexagon head for use in screwing the spark plug 200 into the cylinder head 1 of the engine. This avoids transmission of torque used to install or remove the spark plug 200 into or from the cylinder head 1 to a weld of the holder 80 to the metal shell 10. This structure is, therefore, useful in a case where it is difficult to ensure a strong strength of the weld between the holder 80 and the metal shell 10.

Figure 8:
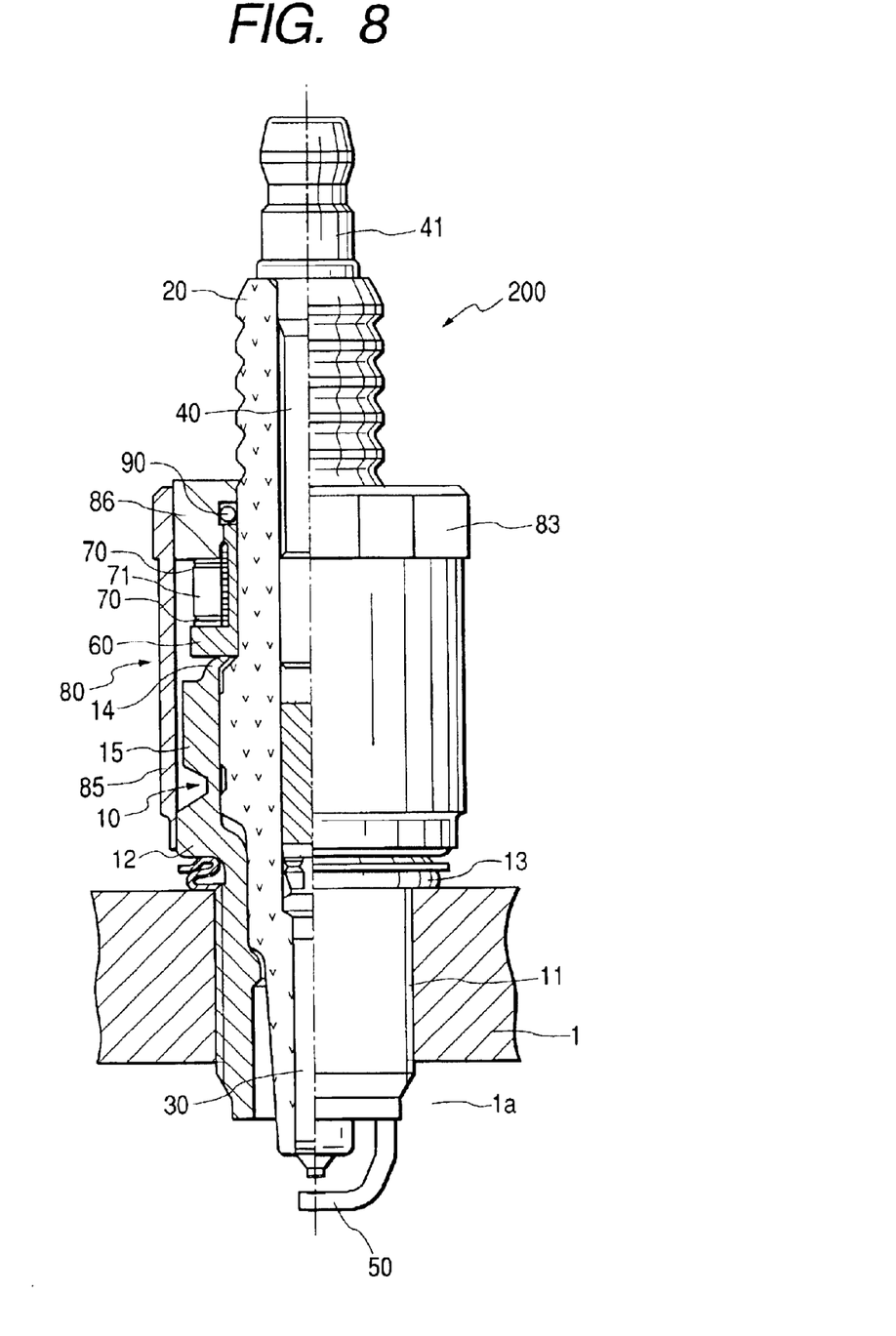
FIG. 8 is a longitudinal partial sectional view which shows a spark plug according to the third embodiment of the invention.

FIG. 8 shows a spark plug 200 according to the third embodiment of the invention which is different from the first embodiment in that the holder 80 is made up of a hollow cylinder 85 and an annular disc 86. Other arrangements are identical, and explanation thereof in detail will be omitted here.

The installation of the holder 80 to the metal shell 10 is accomplished by the following manner.

First, the cylinder 85 of the holder 80 is welded to the whole of the circumference of the first flange 12 of the metal shell 10. Next, the spark plug 200 is disposed within the base 101 of the press jig 100. The press block 102 is placed in the base 101 in direct contact with the annular disc 86 of the holder 80. The bolt 104 is tightened with a given torque to press the annular disc 86 through the press block 102 in the lengthwise direction of the porcelain insulator 20, thereby providing a preload (i.e., a compressive pressure) to the piezoelectric devices 70.

While keeping the preload as it is, a laser beam is radiated through the through holes 101c to form a plurality of discrete welds between the cylinder 85 and the annular disc 86 of the holder 80. After completion of the welding, the spark plug 200 is removed from the press jig 100. Finally, a laser beam is radiated to the overall circumference of the cylinder 85 to weld it to the annular disc 86 completely, thereby ensuring a liquid-tight seal between the cylinder 85 and the annular disc 86.

Figure 9:
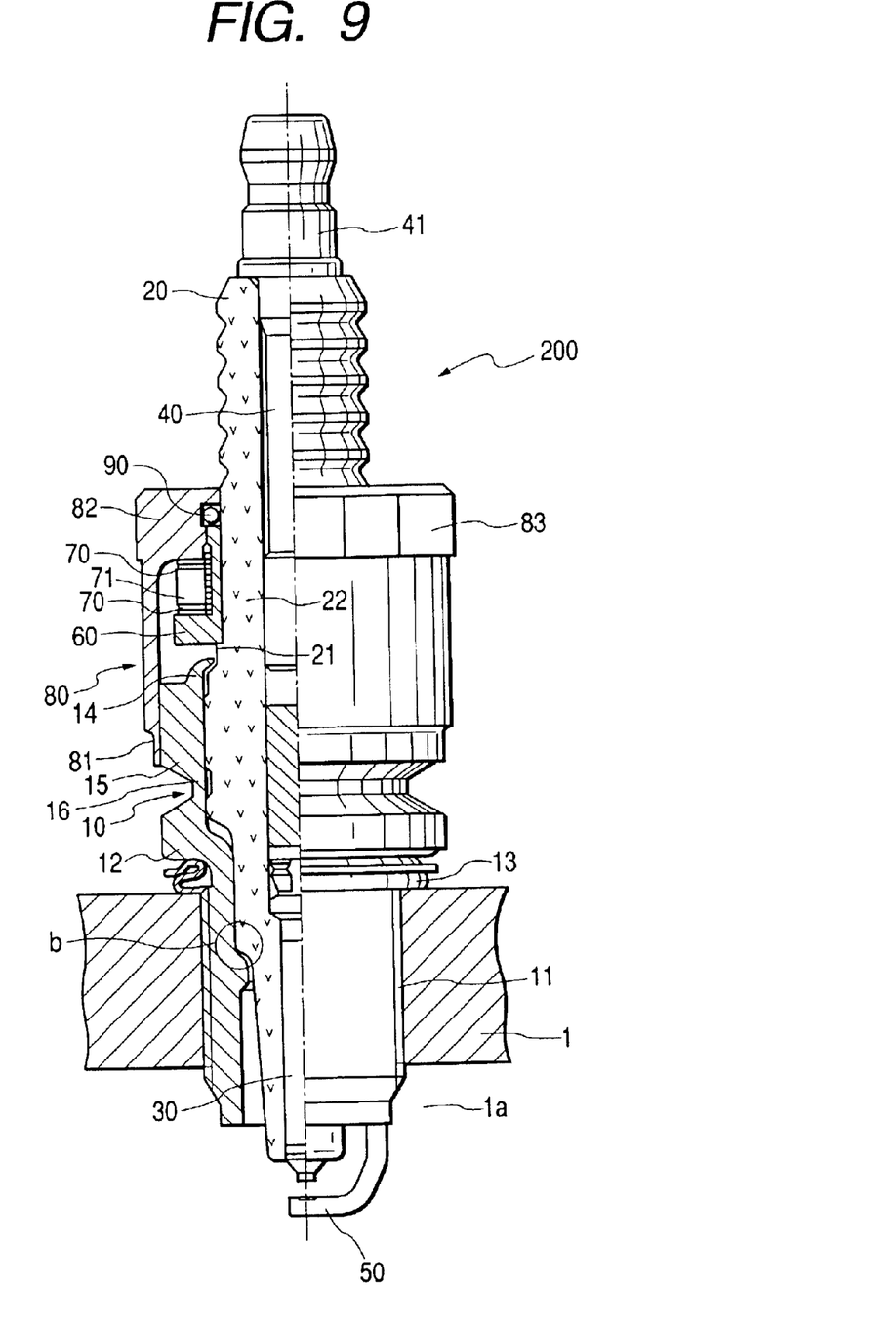
FIG. 9 is a longitudinal partial sectional view which shows a spark plug according to the fourth embodiment of the invention.
Figure 10:
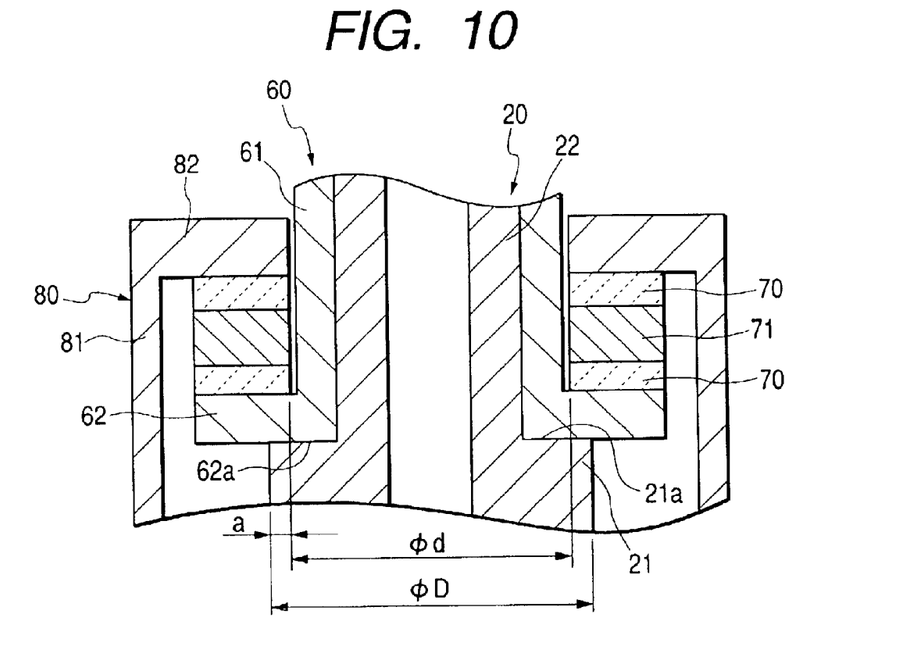
FIG. 10 is a partially enlarged view which shows a shoulder formed on a porcelain insulator as illustrated in FIG. 9.

FIGS. 9 and 10 show a spark plug 200 according to the fourth embodiment of the invention which is different from the first to third embodiment in that the seat 60 is placed directly on a shoulder 21 formed on the periphery of the porcelain insulator 20 at an interval away from the staked portion 14. Other arrangements are identical, and explanation thereof in detail will be omitted here.

The porcelain insulator 20 has a cylindrical guide portion 22 and the shoulder 21 projecting outward from the cylindrical guide portion 22. The shoulder 21 has an annular surface 21a extending perpendicular to the longitudinal center line of the porcelain insulator 20. Similarly, a bottom surface 62a of the flange 62 of the seat 60 which abuts on the annular surface 21a of the shoulder 21 extends perpendicular to the longitudinal center line of the porcelain insulator 20.

The outer diameter $\phi D$ of the shoulder 21 is, as clearly shown in FIG. 10, greater than the inner diameter $\phi d$ of the piezoelectric devices 70 so that the piezoelectric devices 70 may be laid to overlap with the annular surface 21a, thereby increasing the efficiency of transmission of the combustion pressure produced in the engine to the piezoelectric devices 70. An overlap between the annular surface 21a and the piezoelectric devices 70 is indicated by a in FIG. 10.

Between the first and second flanges 12 and 15 of the metal shell 10, a small-diameter portion 16 is formed. The staking the deformable portion 14 is accomplished by heating the small-diameter portion 16 and pressing the deformable portion 14 inward.

When the air-fuel mixture is burned in the combustion chamber 1a of the engine, it will cause the combustion pressure to act on the porcelain insulator 20 to press it upward, as viewed in FIG. 9. This upward pressure is transmitted or applied to the piezoelectric devices 70 through the shoulder 21a and the flange 62 of the seat 60. Specifically, the combustion pressure is transmitted to the piezoelectric devices 70 without passing through the metal shell 10, thus improving the sensitivity of the piezoelectric devices 70.

Usually, vibrations of the engine are transmitted to the piezoelectric devices 70 and added as electric noises to an output of the piezoelectric devices 70. The vibrations enter at the metal shell 10. Therefore, if the metal shell 10 lies on a combustion pressure transmission line, it will cause the vibrations of the engine to be transmitted directly to the piezoelectric devices 70. In contrast, the structure of this embodiment avoids direct transmission of the engine vibrations to the piezoelectric devices 70. Specifically, the engine vibrations inputted to the metal shell 10 are transmitted to the piezoelectric devices 70 through the porcelain insulator 20, thus decreasing the noises added to the output of the piezoelectric devices 70.

The annular portion 14 of the metal shell 10 is pressed inwardly so that it is staked on the periphery of the porcelain insulator 20, as described above, while the small-diameter portion 16 is heated. The pressure applied to stake the annular portion 14 results in longitudinal compression of the metal shell 10 which causes the heated small-diameter portion 16 to contract in the lengthwise direction of the metal shell 10. This results in firm adhesion between the metal shell 10 and the porcelain insulator 20 at the staked portion 14 and a joint of the metal shell 10 and the porcelain insulator 20, thus ensuring hermetic sealing between the metal shell 10 and the porcelain insulator 20.

Figure 11:
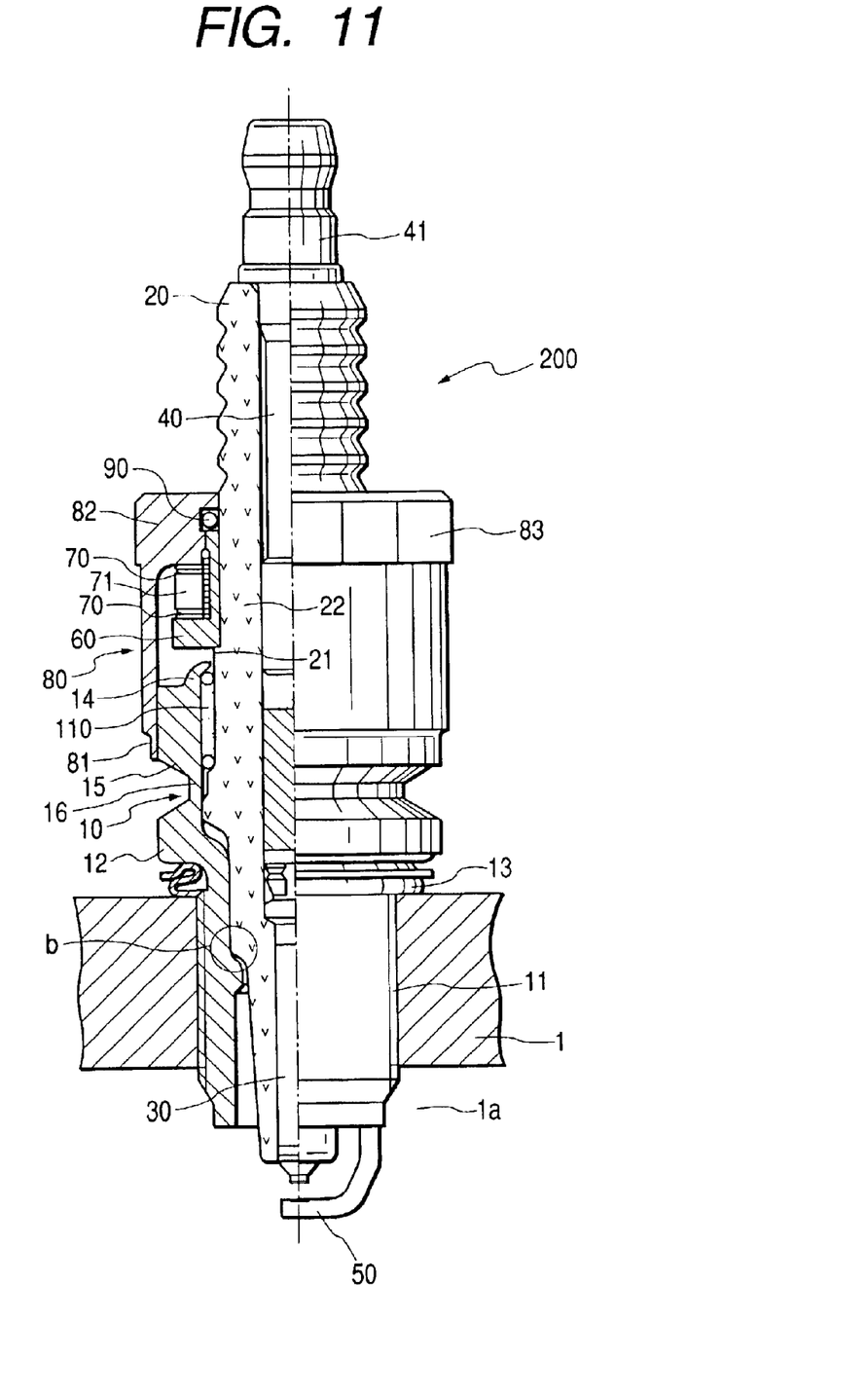
FIG. 11 is a longitudinal partial sectional view which shows a spark plug according to the fifth embodiment of the invention.

FIG. 11 shows a spark plug 200 according to the fifth embodiment of the invention which is different from the fourth embodiment in that the deformable portion 14 of the metal shell 10 is pressed inwardly and staked on the porcelain insulator 20 without heating the small-diameter portion 16.

The metal shell 10 has defines between an inner wall thereof and an outer wall of the porcelain insulator 20 an annular chamber in which talc powder is packed to form a hermetic seal between the metal shell 10 and the porcelain insulator 20. Other arrangements are identical with those in the fourth embodiment, and explanation thereof in detail will be omitted here.

Figure 12:
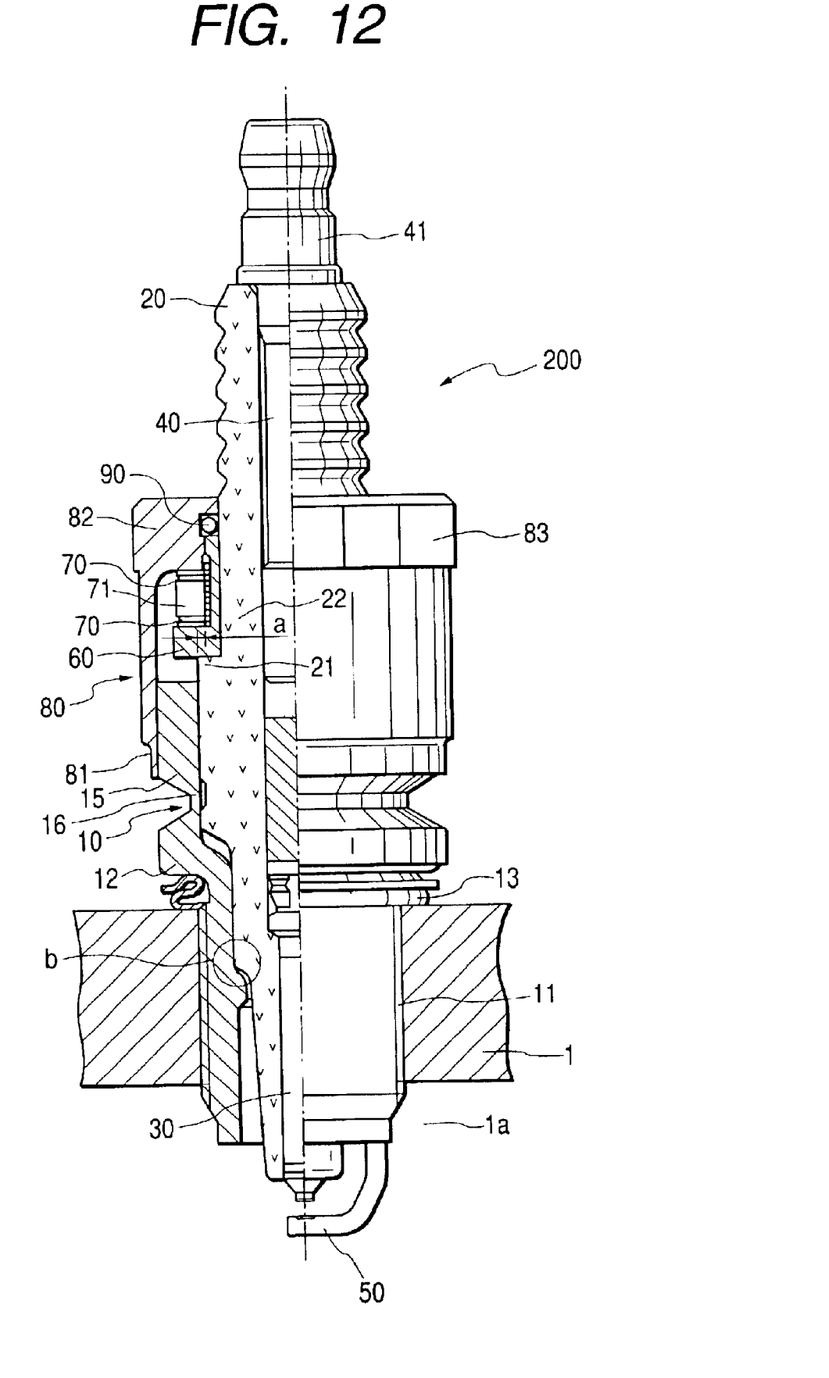
FIG. 12 is a longitudinal partial sectional view which shows a spark plug according to the sixth embodiment of the invention.

FIG. 12 shows a spark plug 200 according to the sixth embodiment of the invention which is different from the fourth embodiment in that the porcelain insulator 20 is fitted in the metal shell 10 without staking the end of the metal shell 10.

The porcelain insulator 20 is retained within the metal shell 10. The holder 80 is fitted on the metal shell 10 to install the piezoelectric devices 70 on the porcelain insulator 20 through the seat 60. The elimination of the staked portion of the metal shell 10 enables the outer diameter of the shoulder 21 of the porcelain insulator 20 to be increased, thus resulting in an increase in the overlap a. Other arrangements are identical with those in the fourth embodiment, and explanation thereof in detail will be omitted here.

The staked portion 14 of the metal shell 10 in the above embodiments restrains the displacement of the porcelain insulator 20 causing the contraction of the piezoelectric devices 70, which leads to a decrease in sensitivity of the piezoelectric devices 70. The structure of this embodiment serves to alleviate such a problem.

The seventh to eleventh embodiments will be described with reference to FIGS. 13 to 17 which are different from the fourth to sixth embodiments only in structure of the shoulder 21 of the porcelain insulator 20 and the seat 60. Other arrangements are identical, and explanation thereof in detail will be omitted here.

Figure 13:
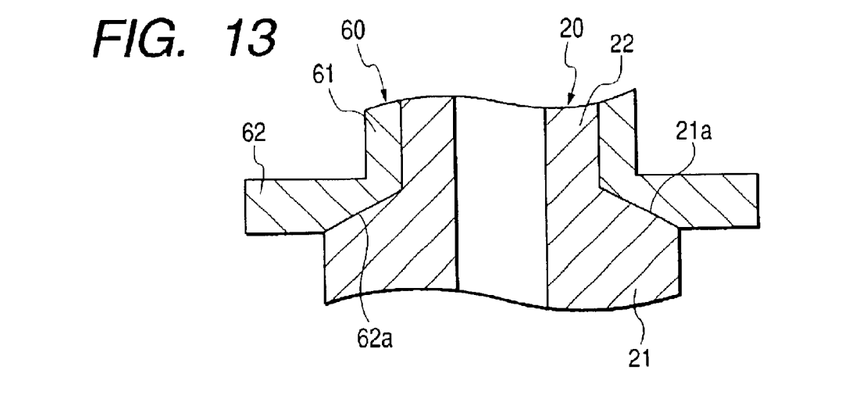
FIGS. 13, 14, 15, 16, and 17 are partially sectional views which show modified structures of a joint between a seat for use in retaining a piezoelectric sensor and a porcelain insulator according to the seventh to eleventh embodiments of the invention.

In the seventh embodiment of FIG. 13, the shoulder 21 of the porcelain insulator 20 has an annular surface 21a which is tapered at a given angle to the longitudinal center line of the porcelain insulator 20. Similarly, the flange 62 of the seat has a surface 62a tapered to establish a close contact with the tapered surface 21a of the porcelain insulator 20.

Figure 14:
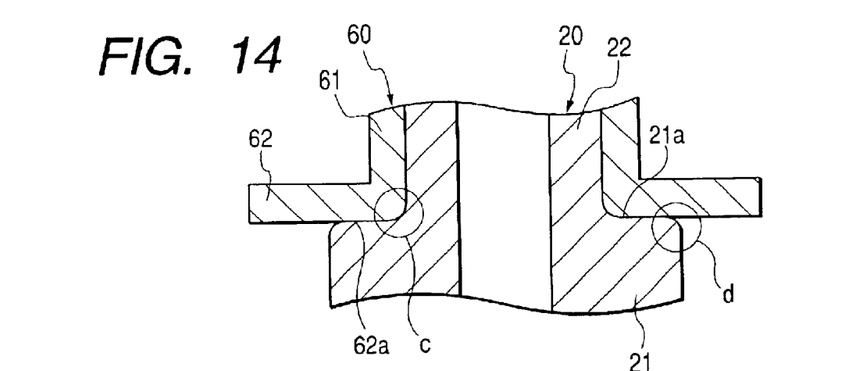

In the eighth embodiment of FIG. 14, the shoulder 21 of the porcelain insulator 20 has a chamfered or rounded outer corner, as indicated by d, and a rounded inner corner, as indicated by c. Similarly, the flange 62 of the seat 60 has a rounded inner corner, as indicated by c.

Figure 15:
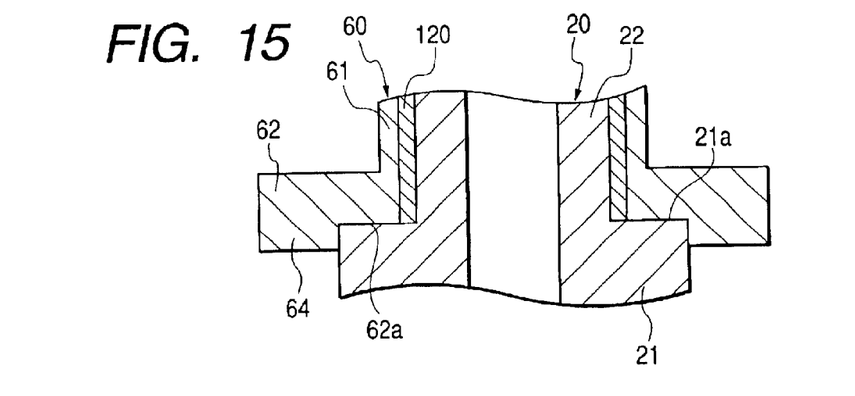

In the ninth embodiment of FIG. 15, the flange 62 of the seat 60 has an annular recess 62a which is fitted on the shoulder 21 of the porcelain insulator 20, thereby establishing a positional relation between the porcelain insulator 20 and the seat 60 in a radius direction thereof accurately. The seat 60 has formed between the inner wall of the cylinder 61 and the outer wall of the cylindrical guide portion 22 of the porcelain insulator 20 a gap within which a sealing member 120 is packed.

Figure 16:
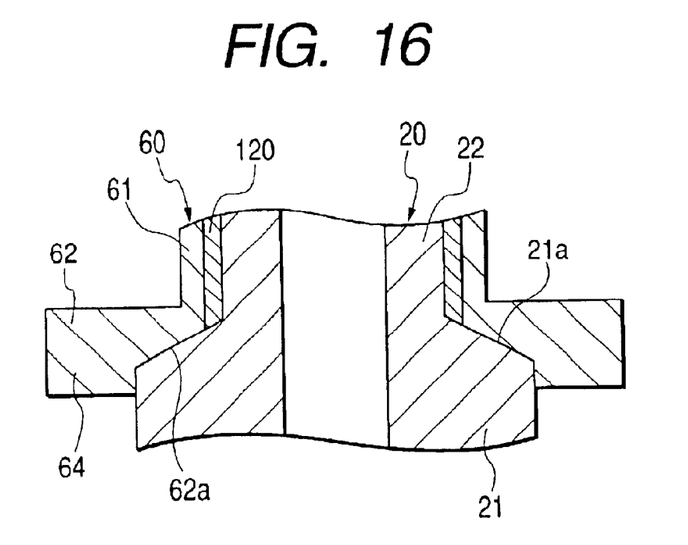

The tenth embodiment of FIG. 16 is a modification of the ninth embodiment in FIG. 15.

The porcelain insulator 20 has the tapered surface 21a. The flange 62 of the seat 60 has the annular recess 62a which is tapered to establish a close fit with the tapered surface 21a of the porcelain insulator 20. The sealing member 120 is disposed between the seat 60 and the porcelain insulator 20. Other arrangements are identical.

Figure 17:
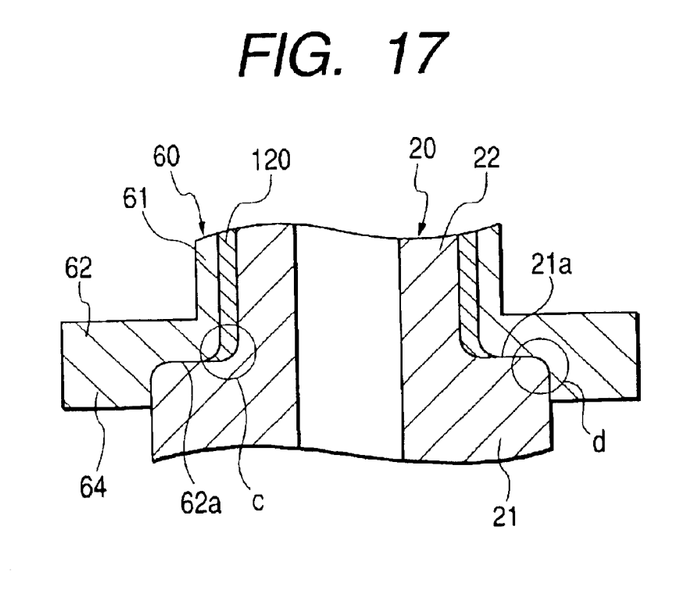

The eleventh embodiment of FIG. 17 is a combination of the eighth and ninth embodiments of FIGS. 14 and 15.

The shoulder 21 of the porcelain insulator 20, like the eighth embodiment, has rounded outer and inner corners. The flange 62 of the seat 60, like the ninth embodiment, has the annular recess 62a which is fitted on the shoulder 21 of the porcelain insulator 20. The annular recess 62a has rounded inner and outer corners. The outer corner of the annular recess 62a is fitted on the outer corner of the shoulder 21 of the porcelain insulator 20. The sealing member 120 is disposed between the seat 60 and the porcelain insulator 20.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For instance, the holder 80 and the metal shell 10 may be joined together by resistance welding, brazing, or soldering. Alternatively, the holder 80 is joined to the metal shell 10 by pressing or staking an end of the holder 80 inwardly. After staked on the metal shell 10, the holder 80 may also be welded. Further, a gap between the holder 80 and the porcelain insulator 2 may be filled with a resinous material such as silicone to form a liquid-tight seal therebetween for avoiding the entrance of water into the piezoelectric devices 70. The resinous material may be packed into the holder 80 through a hole formed in the holder 80 after the holder 80 is secured to the metal shell 10.

What is claimed is:

1. A spark plug comprising:
   a center electrode;
   a porcelain insulator having a first and a second length, the first length having said center electrode retained therein;
   a hollow cylindrical housing in which said center electrode is retained through said porcelain insulator and which has a ground electrode installed thereon;
   a piezoelectric sensor disposed on an outer periphery of the second length of said porcelain insulator, said piezoelectric sensor being responsive to pressure of combustion of fuel within an engine transmitted through said porcelain insulator to provide a signal indicative thereof;
   a holder welded to said housing so as to apply a given preload to the piezoelectric sensor at all times; and
   a shoulder formed on an outer periphery of said porcelain insulator and a seat member disposed between said shoulder and said piezoelectric sensor in direct contact with said shoulder for transmission of the pressure of combustion of fuel to said piezoelectric sensor through said seat member.

2. The spark plug as set forth in claim 1, wherein said holder is made of a hollow cylinder one end of which is welded to an overall circumference of said housing, further comprising a sealing member disposed between the other end of the hollow cylinder and said porcelain insulator, and wherein said piezoelectric sensor is disposed within a chamber formed between said holder and said porcelain insulator.

3. The spark plug as set forth in claim 1, wherein said holder includes a hollow cylinder and an annular disc, the hollow cylinder being welded at one end thereof to an overall circumference of said housing and at the other end to the whole of an outer circumference of the annular disc, further comprising a sealing member disposed between an inner periphery of the annular disc and said porcelain insulator, and wherein said piezoelectric sensor is disposed within a chamber defined by the hollow cylinder, the annular disc, and said porcelain insulator.

4. The spark plug as set forth in claim 1, wherein a chamber within which said piezoelectric sensor is disposed is filled with a resinous material.

5. A spark plug comprising:
   a center electrode;
   a porcelain insulator having a first and a second length, the first length having said center electrode retained therein;
   a hollow cylindrical housing in which said center electrode is retained through said porcelain insulator and which has a ground electrode installed thereon;
   a piezoelectric sensor disposed on an outer periphery of the second length of said porcelain insulator, said piezoelectric sensor being responsive to pressure of combustion of fuel within an engine transmitted through said porcelain insulator to provide a signal indicative thereof; and
   a holder welded to said housing so as to apply a given preload to the piezoelectric sensor at all times,
   wherein said housing has an end portion which is far from said center electrode and staked on said porcelain insulator to retain said porcelain insulator within said housing, and further comprising a seat member disposed between said staked end portion of said housing and said piezoelectric sensor in direct contact with said staked end portion for transmission of the pressure of combustion of fuel to said piezoelectric sensor through said staked end portion and said seat member.

6. A spark plug comprising:
   a center electrode;
   a porcelain insulator having a first and a second length, the first length having said center electrode retained therein;
   a hollow cylindrical housing in which said center electrode is retained through said porcelain insulator and which has a ground electrode installed thereon;

a piezoelectric sensor disposed on an outer periphery of the second length of said porcelain insulator, said piezoelectric sensor being responsive to pressure of combustion of fuel within an engine transmitted through said porcelain insulator to provide a signal indicative thereof;

a holder staked on said housing so as to apply a given preload to the piezoelectric sensor at all times, a shoulder formed on an outer periphery of said porcelain insulator and a seat member disposed between said shoulder and said piezoelectric sensor in direct contact with said shoulder for transmission of the pressure of combustion of fuel to said piezoelectric sensor through said seat member.

7. The spark plug as set forth in claim 6, wherein a chamber within which said piezoelectric sensor is disposed is filled with a resinous material.

8. A spark plug comprising:

a center electrode;

a porcelain insulator having a first and a second length, the first length having said center electrode retained therein;

a hollow cylindrical housing in which said center electrode is retained through said porcelain insulator and which has a ground electrode installed thereon;

a piezoelectric sensor disposed on an outer periphery of the second length of said porcelain insulator, said piezoelectric sensor being responsive to pressure of combustion of fuel within an engine transmitted through said porcelain insulator to provide a signal indicative thereof;

a holder staked on said housing so as to apply a given preload to the piezoelectric sensor at all times, wherein said housing has an end portion which is far from said center electrode and staked on said porcelain insulator to retain said porcelain insulator within said housing, and further comprising a seat member disposed between said staked end portion of said housing and said piezoelectric sensor in direct contact with said staked end portion for transmission of the pressure of combustion of fuel to said piezoelectric sensor through said staked end portion and said seat member.

9. The spark plug as set forth in claim 5, wherein said holder is made of a hollow cylinder one end of which is welded to an overall circumference of said housing, further comprising a sealing member disposed between the other end of the hollow cylinder and said porcelain insulator, and wherein said piezoelectric sensor is disposed within a chamber formed between said holder and said porcelain insulator.

10. The spark plug as set forth in claim 5, wherein said holder includes a hollow cylinder and an annular disc, the hollow cylinder being welded at one end thereof to an overall circumference of said housing and at the other end to the whole of an outer circumference of the annular disc, further comprising a sealing member disposed between an inner periphery of the annular disc and said porcelain insulator, and wherein said piezoelectric sensor is disposed within a chamber defined by the hollow cylinder, the annular disc, and said porcelain insulator.

11. The spark plug as set forth in claim 5, wherein a chamber within which said piezoelectric sensor is disposed is filled with a resinous material.

12. The spark plug as set forth in claim 8, wherein a chamber within which said piezoelectric sensor is disposed is filled with a resinous material.

* * * * *